(12) United States Patent
Bartov et al.

(10) Patent No.: US 9,587,939 B2
(45) Date of Patent: Mar. 7, 2017

(54) METHOD AND SYSTEM FOR MEASURING CONTENT OF A BIN

(71) Applicants: Avishai Bartov, Hod-Hasharon (IL); Yossi Zlotnick, Ramat-Hasharon (IL)

(72) Inventors: Avishai Bartov, Hod-Hasharon (IL); Yossi Zlotnick, Ramat-Hasharon (IL)

(73) Assignee: APM Automation solutions Ltd., Tel Aviv (IL)

(*) Notice: Subject to any disclaimer, the term of this patent is extended or adjusted under 35 U.S.C. 154(b) by 1081 days.

(21) Appl. No.: 13/747,493

(22) Filed: Jan. 23, 2013

(65) Prior Publication Data
US 2014/0207412 A1 Jul. 24, 2014

(51) Int. Cl.
*G01F 23/00* (2006.01)
*G01B 21/20* (2006.01)
*G01F 23/296* (2006.01)

(52) U.S. Cl.
CPC ......... *G01B 21/20* (2013.01); *G01F 23/0076* (2013.01); *G01F 23/2962* (2013.01)

(58) Field of Classification Search
CPC .. G01B 21/20; G01F 23/2962; G01F 23/0076
USPC ................... 702/156, 167; 73/290
See application file for complete search history.

(56) References Cited

U.S. PATENT DOCUMENTS

| | | | | |
|---|---|---|---|---|
| 5,587,969 A | * | 12/1996 | Kroemer | G01F 23/296 367/908 |
| 2009/0007627 A1 | * | 1/2009 | Perl | G01F 23/2962 73/1.73 |

* cited by examiner

*Primary Examiner* — John H Le
(74) *Attorney, Agent, or Firm* — Reches Patents (57) ABSTRACT

A method, non-transitory computer readable medium and a system that includes a confidence level module arranged to calculate, in response to detection signals, estimated upper surface points and to associate a non-binary confidence level with each estimated upper surface point; wherein the detection signals are generated by a receiver in response to an irradiation of at least a portion of the upper surface of the content with radiation pulses transmitted by a transmitter; and an estimator that is arranged to calculate an estimate of the upper surface based upon the estimated upper surface points and the non-binary confidence level associated with each estimated upper surface point.

34 Claims, 7 Drawing Sheets

METHOD AND SYSTEM FOR MEASURING CONTENT OF A BIN

BACKGROUND OF THE INVENTION

The present invention relates to monitoring of inventory and to process measurement, and, more particularly, to a system and method for measuring the content of a bin.

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arises from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors are complex and expensive.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin such as a silo that would overcome the disadvantages of presently known methods as described above. In particular, it is not known in the prior art to map the upper surface of the bin contents in three dimensions.

SUMMARY OF THE INVENTION

According to an embodiment of the invention there is provided a system for estimating an upper surface of a content of a bin, the system may include: a confidence level module arranged to calculate, in response to detection signals, estimated upper surface points and to associate a non-binary confidence level with each estimated upper surface point; wherein the detection signals may be generated by a receiver in response to an irradiation of at least a portion of the upper surface of the content with radiation pulses transmitted by a transmitter; and an estimator that may be arranged to calculate an estimate of the upper surface based upon the estimated upper surface points and the non-binary confidence level associated with each estimated upper surface point.

The radiation pulses may be pulses of acoustic energy and the receiver receives echoes of the pulses of acoustic energy.

The system may include at least one of the receiver and the transmitter.

The system may include the receiver and the transmitter.

The confidence level module may include a fuzzy logic engine.

The estimator may include: an interpolation module that may be arranged to calculate suggested estimates of the upper surface; and an augmentation module that may be arranged to augment the suggested estimates of the upper surface to provide augmented estimates in response to non-binary confidence levels of the estimated upper surface points.

The interpolation module and the augmentation modules may be arranged to operate in an iterative manner to gradually increase a number of estimated upper surface points to be taken into account when calculating the suggested estimates and the augmented suggested estimates of the upper surface.

The interpolation module and the augmentation modules may be arranged to operate in an iterative manner to gradually increase a number of estimated upper surface points by a single estimated upper surface point between one iteration to another.

The interpolation module and the augmentation modules select the estimated upper surface points in a descending order of confidence levels.

The interpolation module applies a natural neighbor interpolation.

The system may include a reference point module that may be arranged to calculate reference points outside the bin; wherein the estimator may be arranged to calculate the estimate of the upper surface in response to the estimated upper surface points, the non-binary confidence level associated with each estimated upper surface point and the reference points.

The reference point module may be arranged to calculate reference points in response to the estimated upper surface points and to the non-binary confidence level associated with each estimated upper surface point.

The reference point module may be arranged to calculate a sum of products, each product equals a height of each estimated upper surface point multiplied by a non-binary confidence level associated with the estimated upper surface point; and to set a height of the reference points in response to the sum of products.

The reference point module may be arranged to set the reference points at a distance from the bin that is responsive to a dimension of the bin.

The distance from the bin is a fraction of a width of the bin.

The system wherein each non-binary confidence level is selected out of at a continuous range of confidence levels.

According to an embodiment of the invention there is provided a computerized method for estimating an upper surface of a content of a bin, may include: calculating, in response to detection signals, estimated upper surface points; associating a non-binary confidence level with each estimated upper surface point; calculating, by an estimator, an estimate of the upper surface based upon the estimated upper surface points and the non-binary confidence level associated with each estimated upper surface point; wherein the detection signals may be generated by a receiver in response to an irradiation of at least a portion of the upper surface of the content with radiation pulses transmitted by a transmitter.

The radiation pulses may be pulses of acoustic energy and the receiver receives echoes of the pulses of acoustic energy.

The method may include receiving, by the receiver, echoes of the pulses of acoustic energy and producing the detection signals in response to the echoes.

The method may include transmitting, by the transmitter, pulses of acoustic energy towards the upper surface of the content.

The method may include associating the non-binary confidence level with each estimated upper surface point by applying a fuzzy logic algorithm.

The method may include: calculating, by an interpolation module, suggested estimates of the upper surface; and augmenting, by an augmentation module, the suggested estimates of the upper surface to provide augmented estimates in response to non-binary confidence levels of the estimated upper surface points.

The method may include repeating the stages of: selecting at least one new estimated upper surface point; calculating, by the interpolation module, a new suggested estimate of the upper surface while taking into account the at least one new estimated upper surface point and previously selected estimated upper surface points; augmenting, by the augmentation module, the new suggested estimate of the upper surface to provide a new augmented estimate, wherein the augmenting is responsive to each non-binary confidence level of the at least one new estimated upper surface point.

The method may include selecting a single new estimated upper surface point at each repetition of the stages.

The method may include selecting the at least one new estimated upper surface point in a descending order of confidence levels.

The calculating, by the interpolation module, of the new suggested estimate may include applying a natural neighbor interpolation.

The method may include calculating reference points outside the bin; wherein the calculating, by an estimator, of the estimate of the upper surface is further responsive to the reference points.

The calculating of the reference points is responsive to the estimated upper surface points and to a non-binary confidence level associated with each estimated upper surface point.

The calculating of the reference points may include calculating a sum of products, each product equals a height of each estimated upper surface point multiplied by a non-binary confidence level associated with the estimated upper surface point; and setting a height of the reference points in response to the sum of products.

The method may include setting the reference points at a distance from the bin that is responsive to a dimension of the bin.

The distance from the bin is a fraction of a width of the bin.

The method wherein each non-binary confidence level is selected out of at a continuous range of confidence levels.

According to an embodiment of the invention there is provided a non-transitory computer readable medium that stores instruction that cause a computerized system to: calculate, in response to detection signals, estimated upper surface points; associate a non-binary confidence level with each estimated upper surface point; and calculate, by an estimator, an estimate of the upper surface based upon the estimated upper surface points and the non-binary confidence level associated with each estimated upper surface point; wherein the detection signals may be generated by a receiver in response to an irradiation of at least a portion of the upper surface of the content with radiation pulses transmitted by a transmitter.

The radiation pulses may be pulses of acoustic energy and the receiver receives echoes of the pulses of acoustic energy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The present invention is of a system for measuring the quantity of material stored in a bin such as a silo, Open bin, Dome etc. Specifically, the present invention can be used to monitor inventory in a silo.

The principles and operation of content measuring according to the present invention may be better understood with reference to the drawings and the accompanying description.

Figure 1:
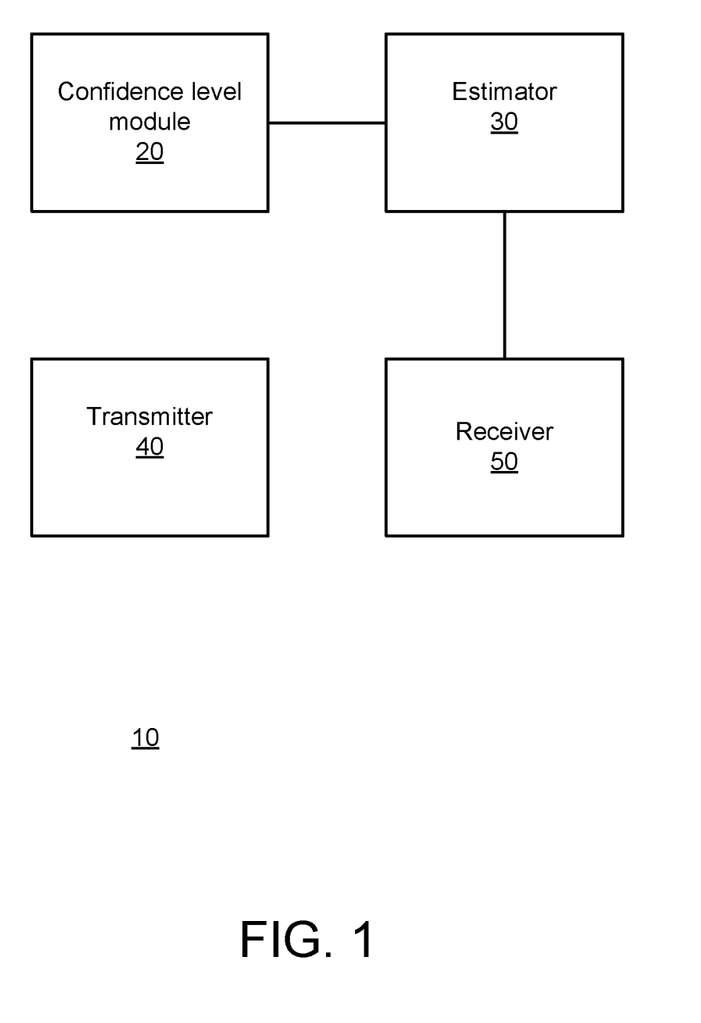
FIG. 1 is a high-level schematic functional block diagram of a system of the present invention.

FIG. 1 illustrates a system 10 according to an embodiment of the invention.

System 10 includes a confidence level module 20 and an estimator 30. These modules may belong to (or may form) a computerized system.

FIG. 1 illustrates system 10 as further including receiver 50 and transmitter 40. It is noted that the inclusion of any of these components within the system 10 is optional.

The confidence level module 20 may be arranged to calculate, in response to detection signals, estimated upper surface points and to associate a non-binary confidence level with each estimated upper surface point. The detection signals are generated by a receiver (such as receiver 50) in response to echoes of pulses of acoustic energy, the echoes are received by the receiver 50 and the pulses of acoustic energy are transmitted by a transmitter (such as transmitter 40) towards the upper surface of the content.

The pulses of acoustic energy may might be wide enough to cover, without scanning relatively large areas of the upper surface of the content—in comparison to much narrower areas that can be covered by narrow cross section radio frequency or narrow cross section (aperture of about 10 degrees) ultrasonic waves. It is noted that the invention can be applicable mutatis mutandis to large (aperture of about 60-80 degrees) cross section radio frequency pulses (for example about 1 Ghz radio frequency pulses) or to scanning systems using radio frequency or scanning systems using ultrasonic waves. The pulses of acoustic energy can have a frequency between 2-7 Hertz.

The estimator 30 can be arranged to calculate an estimate of the upper surface based upon the estimated upper surface points and the non-binary confidence level associated with each estimated upper surface point.

Figure 3:
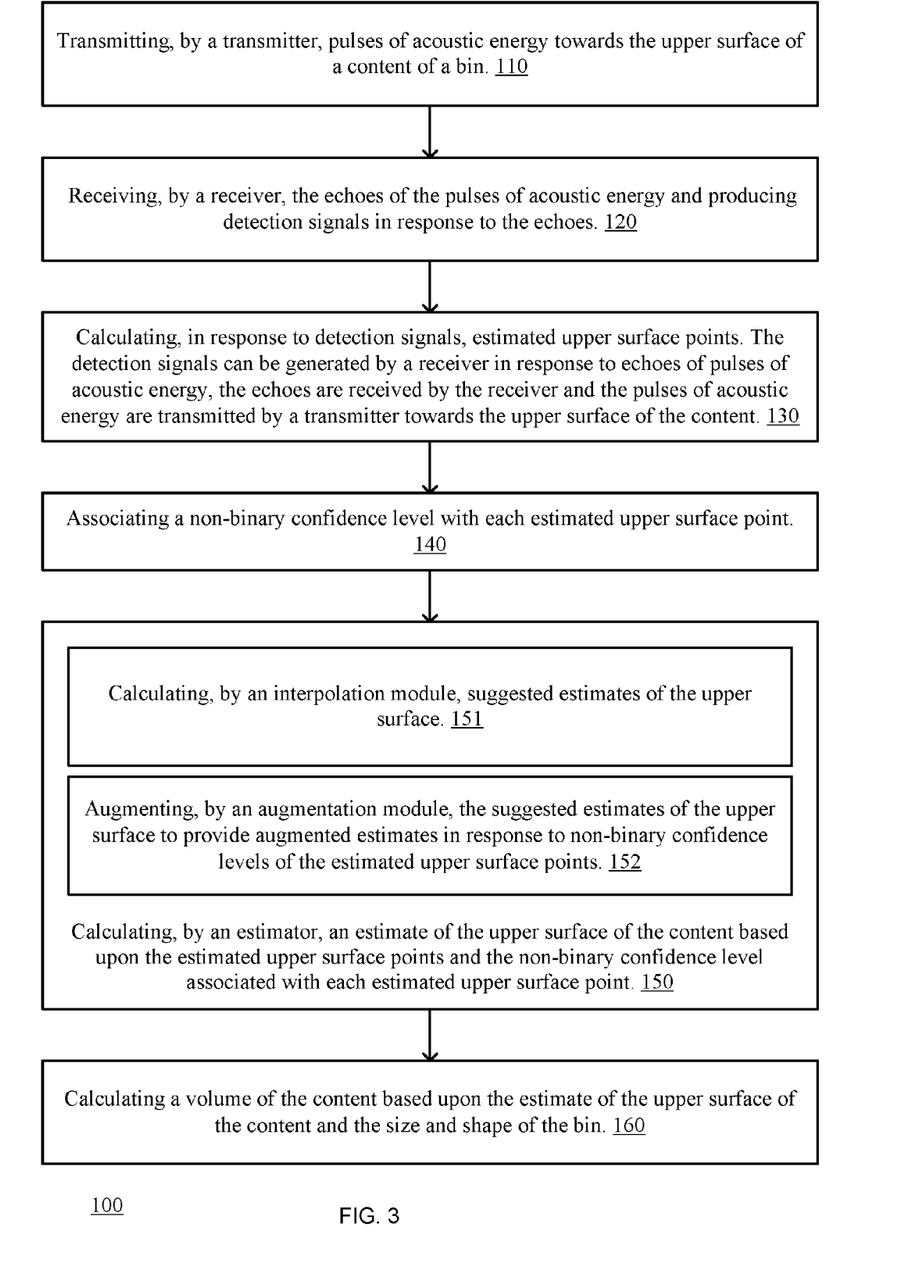
FIG. 3 illustrates a method according to an embodiment of the invention.
Figure 5:
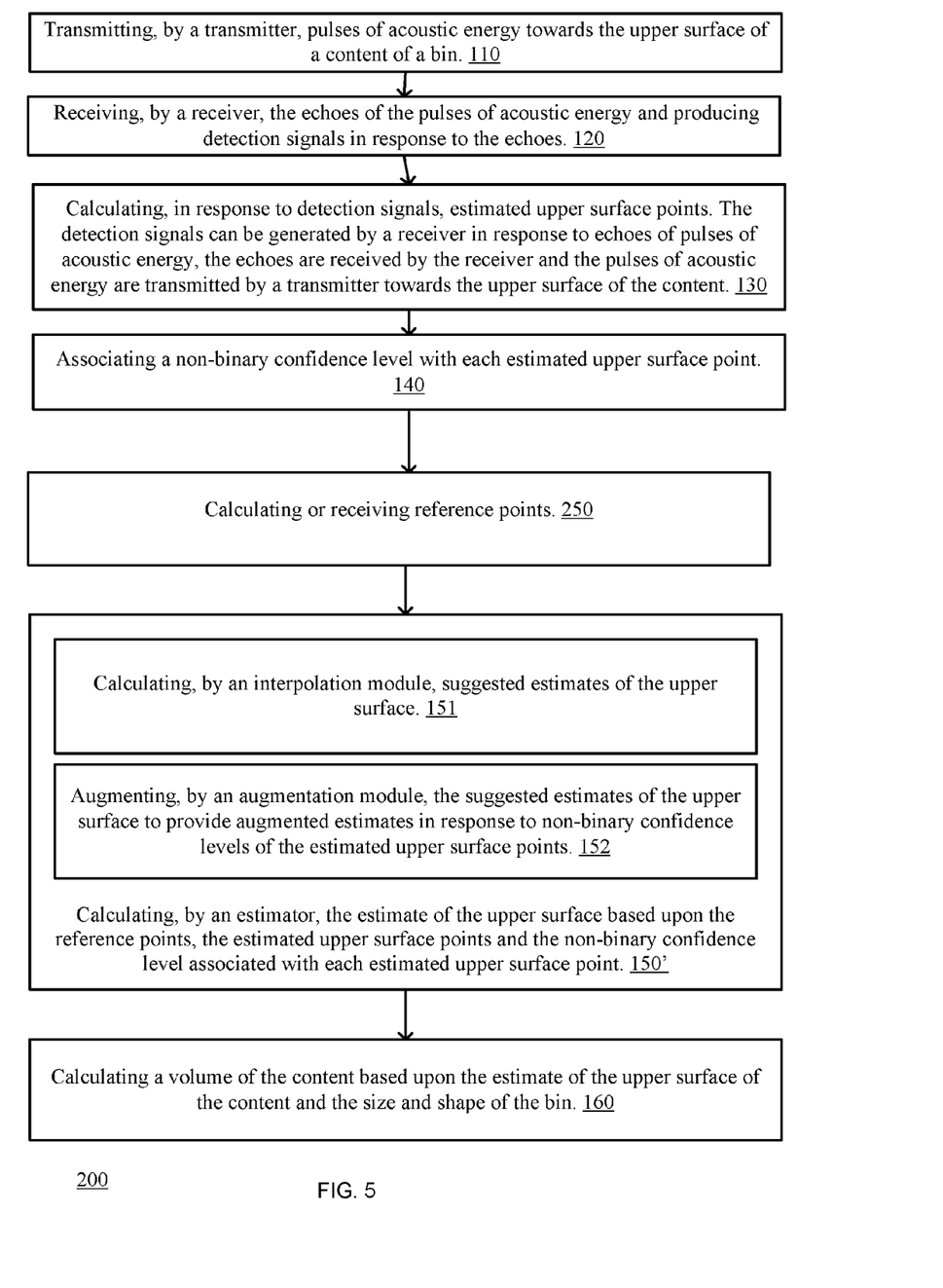
FIG. 5 illustrates a method according to an embodiment of the invention.

System 10 may execute any one of method 100 and 200 and any combination of stages of these methods.

Figure 2:
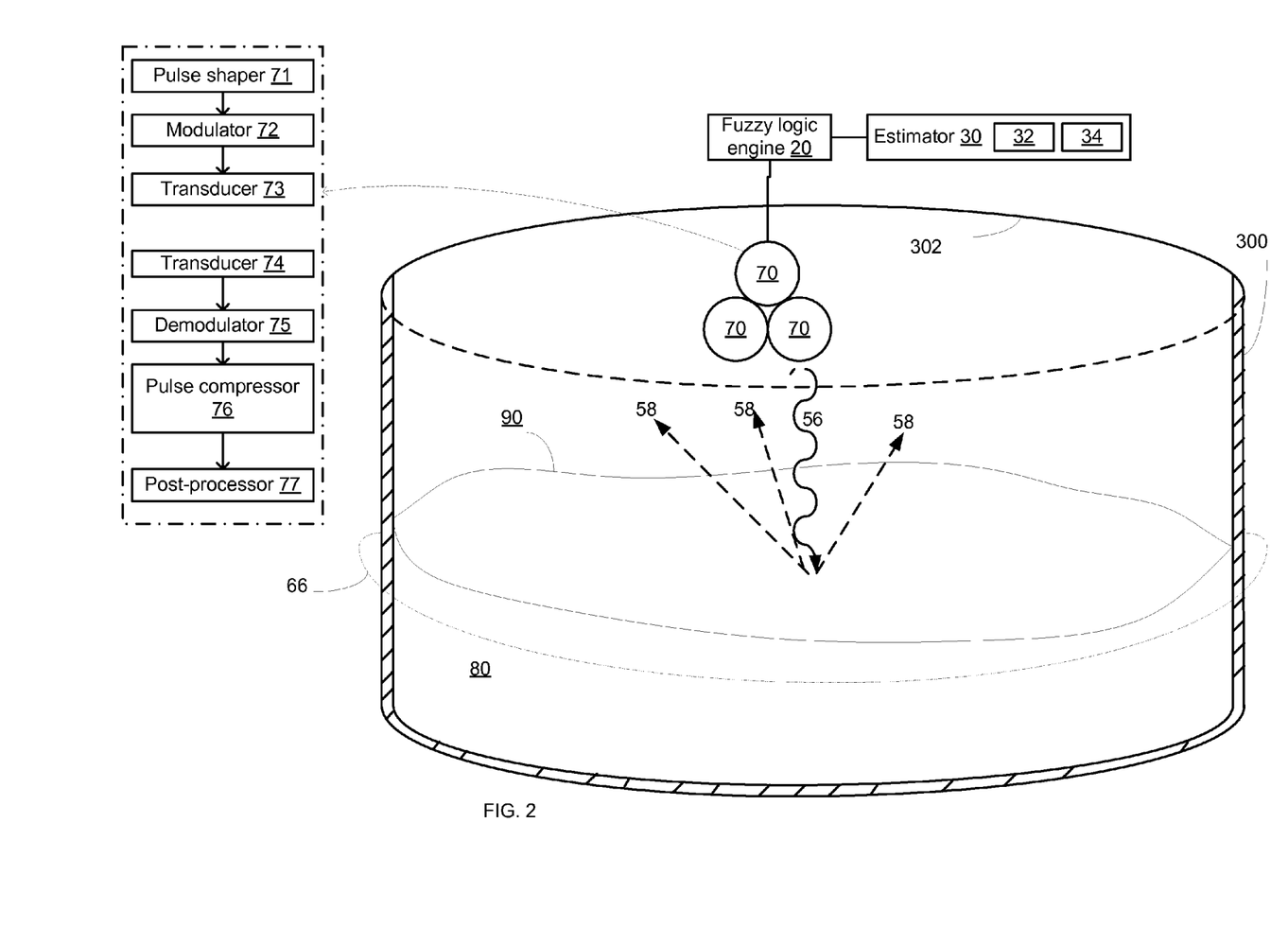
FIG. 2 is a partially cut-away view of a silo with the system of FIG. 1 mounted on the ceiling of the silo.

FIG. 2 is a partially cut-away view of a silo 300 with system 10 mounted on the ceiling 302 of silo 300 and facing an upper surface 90 of content, according to an embodiment of the invention.

The system 10 is aimed to assist in estimating a volume of the content 80.

The shape and dimensions of the silo 300 may be known in advance (may be fed to system) and thus all the outer boarders of the content 80—except the upper surface of the content 80 are known.

Transmitter 40 and receiver 50 (of FIG. 1) are implemented by three non-collinear acoustic transceivers 70. A non-limiting example of such acoustic transceivers is illustrated in U.S. Pat. No. 8,091,421 which is incorporated herein by reference. It is noted that the number of transceivers can differ from three and that radio frequency and ultrasonic radiation can be used.

Each acoustic transceiver 70 may include a transmission path and a reception path. The transmission path may include a pulse shaper 71, a modulator 72 and a transducer (speaker) 73 while the reception path can include a transducer (microphone) 74, a demodulator 75, a pulse compressor 76 and a post processor 77 such as those illustrated in US patent application titled "Variable length ranging and direction-finding signals constructed from beamlimited kernals and sparse spreading sequences", having a Ser. No. 13/041,461 filing date Mar. 7, 2011 which is incorporated herein by reference.

Pulse shaper 71 generates a baseband pulse from a kernel. Modulator 72 modulates a carrier wave with the baseband pulse. Transducer 73 launches modulated carrier wave, into a medium that supports propagation of the carrier wave, as a transmitted acoustic pulse 56, towards the upper surface 90 of the content.

Echo 58 is reflected from the upper surface 90 and received by transducers 74. Demodulator 75 demodulates the echo to provide a received representation of the baseband pulse.

Pulse compressor 76 compresses the representation of the baseband pulse by de-convolution. The pulse compression provides a compressed pulse that is a time-shifted representation of the original kernel. Post-processor 77 applies post-processing the compressed pulse and infers the range to multiple points of the upper surface 90 as one-half of the product of the round-trip travel time of acoustic pulse 56 and echo 58.

The directional information is obtaining by using different combinations of transceivers 70 to transmit acoustic pulses and receive echoes.

One or more transceivers 70 may function at any given point of time as transmitters and may emit a pulse of acoustic energy (acoustic pulse) 56 towards the upper surface 90 of content 80 of silo 300.

Acoustic pulse 56 is represented symbolically in FIG. 2 as a waveform emerging from one of transceivers 70. An echo of acoustic pulse 56 that is reflected from upper surface 90 back towards transceivers 70 is represented in FIG. 2 by arrows 58.

Echo 58, that is received by transceivers 70 functioning as receivers 50, that in turn are capable of generating detection signals representative of the shape of the upper surface 90 of content 80.

The detection signals may be responsive to the time of arrival of the echo, relationships between time of arrival of the echo to different transceivers, and the spatial arrangement of the transceivers.

FIG. 2 illustrates the confidence level module as being a fuzzy logic engine 22.

The estimator 30 is illustrated as including an interpolation module 32 that is arranged to calculate suggested estimates of the upper surface; and as including an augmentation module 34 that is arranged to augment the suggested estimates of the upper surface to provide augmented estimates in response to non-binary confidence levels of the estimated upper surface points.

The interpolation module 32 and the augmentation module 34 are arranged to operate in an iterative manner to gradually increase a number of estimated upper surface points to be taken into account when calculating the suggested estimates and the augmented suggested estimates of the upper surface.

According to an embodiment of the invention the system may also include reference point module 60 that is arranged to calculate reference points outside the bin; wherein the estimator is arranged to calculate the estimate of the upper surface in response to the estimated upper surface points, the non-binary confidence level associated with each estimated upper surface point and the reference points.

FIG. 2 also illustrates these reference points 66.

FIG. 3 illustrates method 100 according to an embodiment of the invention.

Method 100 starts by stage 110 of transmitting, by a transmitter, pulses of acoustic energy towards the upper surface of a content of a bin.

Stage 110 may be followed by stage 120 of receiving, by a receiver, the echoes of the pulses of acoustic energy and producing detection signals in response to the echoes.

A non-limiting example of the transmission of pulses of acoustic energy and of the reception of echoes is provided in U.S. Pat. No. 8,091,421 which is incorporated herein by reference.

Stage 120 is followed by stage 130 of calculating, in response to detection signals, estimated upper surface points. The detection signals can be generated by a receiver in response to echoes of pulses of acoustic energy, the echoes are received by the receiver and the pulses of acoustic energy are transmitted by a transmitter towards the upper surface of the content.

Each estimated upper surface point is an estimate of a location of a point of the upper surface of the content. The upper surface is a three dimensional entity and each estimate may include three coordinates—such as an x-axis, y-axis and z-axis coordinates. The z-axis coordinate may be selected to represent the estimate height of upper surface point.

It is noted that stage 130 can be applied mutatis mutandis to non-Cartesian coordinate systems (for example—a polar coordinate system) and that the reference to the Cartesian coordinate system is provided only as an example.

The estimated upper surface points can relate to a group of upper surface points that are a subset of the points that form the entire upper surface. The group of points can be arranged in an ordered or un-ordered grid, and its members may be spread in an even or an uneven manner. Usually, the points that belong to the group are points that reflect or scatter relatively strong echoes towards the receiver. These points can be extreme points (local minimum points, local maximum points) of the upper surface of the content, edges or curves of the upper surface of the content and the like.

Stage 130 is followed by stage 140 of associating a non-binary confidence level with each estimated upper surface point.

The non-binary confidence level is non-binary in the sense that it has more and even much more possible values than two levels. The non-binary confidence levels can be selected out of one or more continuous and/or non-continuous confidence levels. The number of possible non-binary confidence levels may be 10, 20, 30, 40, 50, 60, 70, 80, 90, 100 and even more.

A non-binary confidence level of an estimated upper surface point can reflect the accuracy (expected, estimated or actual) of the estimate of the location of a point of the upper surface of the content.

A non-binary confidence level can refer to each one or the coordinates of the location—but for simplicity of explanation it is assumed that a single non-binary confidence level is proved per a single estimate upper surface point. It is further assumed that the non-binary confidence level refers to the accuracy of the estimated height of the estimated upper surface point.

The non-binary confidence level of an estimated upper surface point can be calculated by a fuzzy logic engine that applies a fuzzy logic algorithm.

The non-binary confidence level of an estimated upper surface point can be responsive to estimated location of other upper surface points, to expected slopes of the upper surface, to a shape of the bin, to locations of inlets and/or outlets of the bin and the like.

The expected slopes of the upper surface can be evaluated based upon content characteristics such the chemical composition of the content, physical properties such as shape, size and rigidness of content elements.

The expected slopes can be also calculated in response to the shape and size of the bin, to size and location of bin outlets and inlets, ventilation of the bin, timing of insertion or removal of content from the bin, and the like.

The non-binary confidence level of an estimated upper surface point can be related to previous estimates of the estimated upper surface point or to previous estimates of other estimated upper surface points. For example, estimated upper surface points that remain substantially the same over time can be provided with a higher non-binary confidence level than those provided to estimated upper surface points that do not remain substantially the same over time. The non-binary confidence level can be responsive to the deviation (for example standard deviation) of the estimated location of the estimated upper surface point over time.

Yet according for another example, the non-binary confidence level of an estimated upper surface point can be responsive to an estimate error of a previous estimated upper surface point. The error can be calculated in relation to an actual location of the upper surface point. The error can, alternatively, be calculated in response to a difference between a location of a upper surface point as calculated in response to the detection signals (that may be calculated during a previous iteration of stage 130 of method 100) and to a location of the upper surface point at the estimate of the upper surface (that may be the final outcome of the previous iteration of method 100).

It is noted that stage 130 and 140 can partially overlap or be executed concurrently. Accordingly, the calculation of the estimated upper surface points can include associating a non-binary confidence level with each estimated upper surface point.

Stage 140 is followed by stage 150 of calculating, by an estimator, an estimate of the upper surface of the content based upon the estimated upper surface points and the non-binary confidence level associated with each estimated upper surface point.

Stage 150 may include stage 151 of calculating, by an interpolation module, suggested estimates of the upper surface and stage 152 of augmenting, by an augmentation module, the suggested estimates of the upper surface to provide augmented estimates in response to non-binary confidence levels of the estimated upper surface points.

Stage 150 may also include stage 153 of sorting the estimated upper surface points according to their confidence level.

Stage 150 may include multiple iterations of stages 154-157. Stage 153 and stages 154-157 are illustrates in FIG. 4. These stages are further explained by examples of a suggested estimate 520 and augmented suggested estimates of the upper surface as set in FIGS. 6A-6D.

Figure 4:
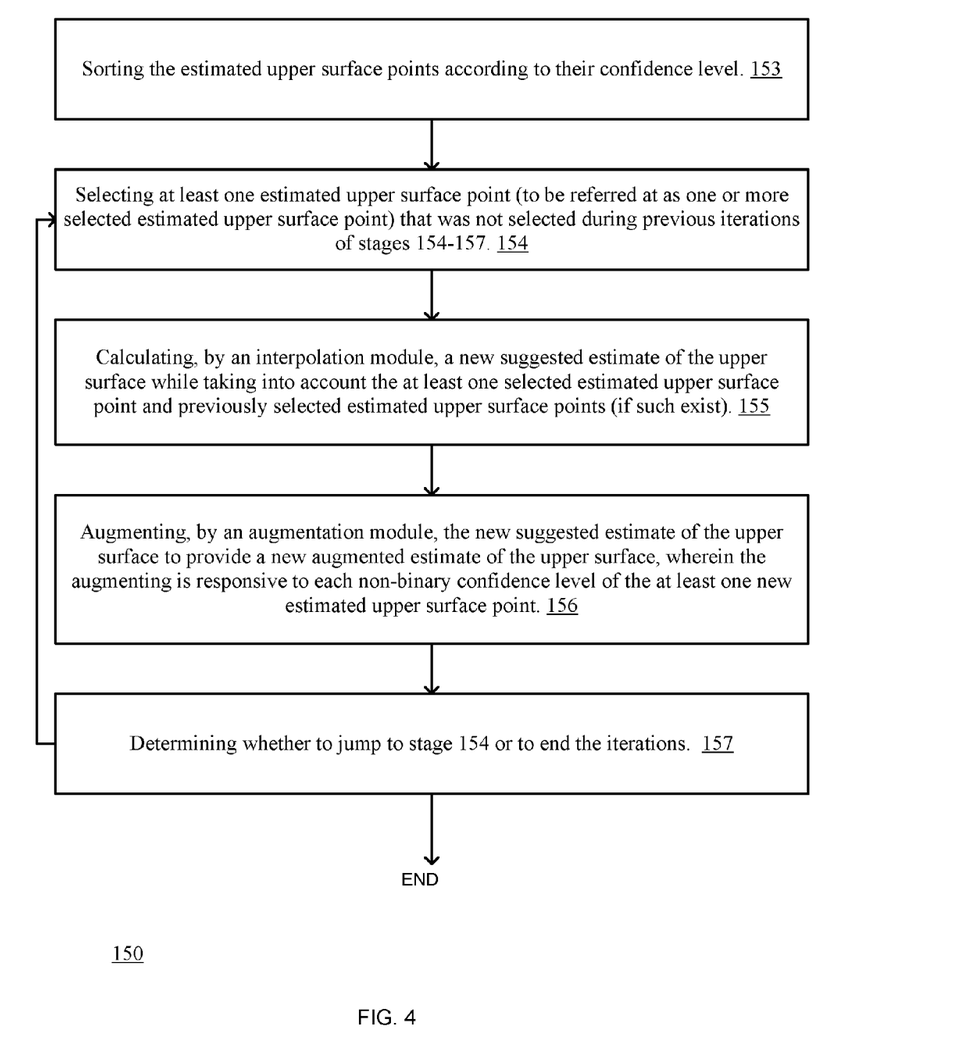
FIG. 4 illustrates various stages of the method of FIG. 3 according to an embodiment of the invention.

Stage 154 may include selecting at least one estimated upper surface point (to be referred at as one or more selected estimated upper surface point) that was not selected during previous iterations of stages 154-157.

The selection can be made in response to the confidence level of the estimated upper surface points—for example the selection can start with the estimated upper surface points with the highest confidence level and continue in a descending order.

The selection between upper surface points that have the same confidence level can be made randomly, pseudo-randomly, according to a predetermined scheme and the like.

Stage 154 may be followed by stage 155 of calculating, by an interpolation module, a new suggested estimate of the upper surface while taking into account the at least one selected estimated upper surface point and previously selected estimated upper surface points (if such exist).

Stage 155 may include updating an augmented estimate of the upper surface that was calculated during the last previous iteration of stages 154-157 with the at least one selected estimated upper surface point.

Figure 6A:
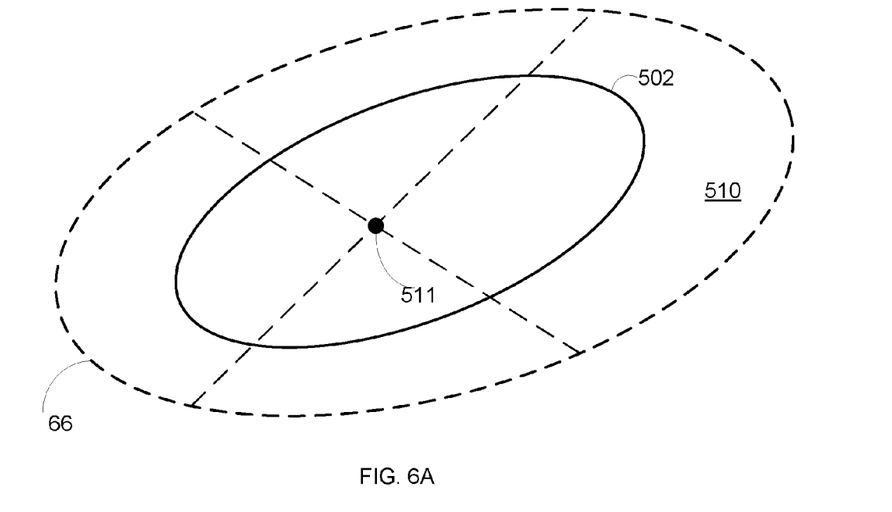
FIGS. 6A-6D illustrate suggested estimates of the upper surface according to various embodiments of the invention.

FIG. 6A illustrates an augmented estimate 510 of the upper surface of the content. It includes point 511 that is has coordinates (not shown) of (x1, y1, z1). The augmented estimate 510 is delimited by reference points 66—located outside a silo—as illustrates by an ellipse 502 that represents a horizontal cross section of the silo.

Figure 6B:
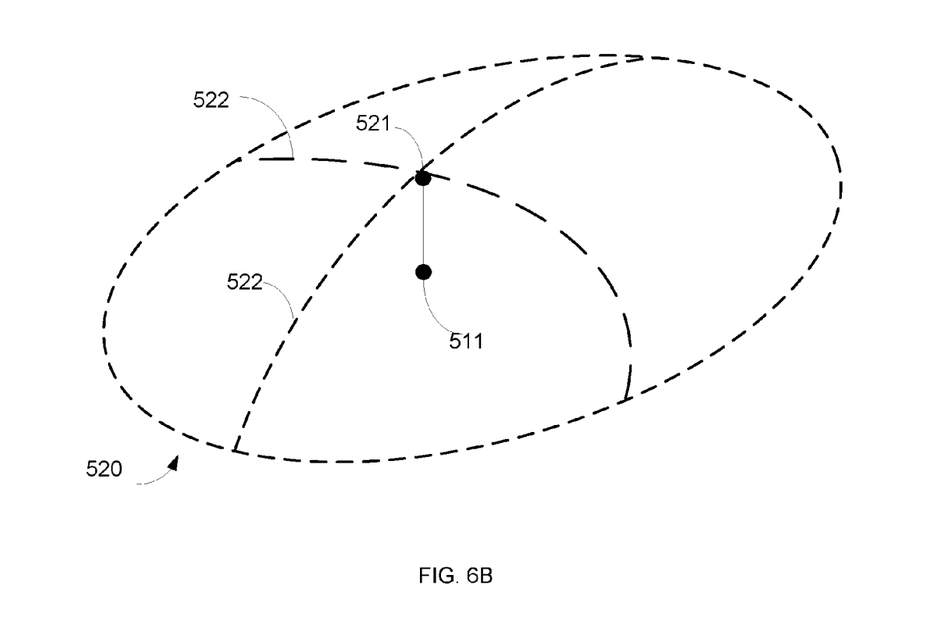

FIG. 5B illustrates a new suggested estimate 520 of the upper surface of the content. The new suggested estimate 520 is delimited by reference points 66 and is illustrated by curved lines 522 that extend from an imaginary ellipse formed by reference points 66. The new suggested estimate 520 has an estimated upper surface point 521 that has coordinates (not shown) of (x1, y1, z2). It is higher than point 511.

Stage 155 can include applying a natural neighbor interpolation. The natural neighbor interpolation is known in the art and required no additional explanations. It can be used for interpolating two and three dimensional objects. The natural neighbor interpolation was developed by Robin Sibson and is based upon a Voronoi tessellation of a discrete set of spatial points. It is noted that other interpolation methods can be applied such as krigging, radial basis and the like.

The discrete set of points can belong to the augmented estimate of the upper surface that was calculated during the last previous iteration of stages 154-157 and the updating can involve calculating the change induced in that augmented estimate when taking into account the one or more selected estimated upper surface points.

Stage 155 may be followed by stage 157 of augmenting, by an augmentation module, the new suggested estimate of the upper surface to provide a new augmented estimate of the upper surface, wherein the augmenting is responsive to each non-binary confidence level of the at least one new estimated upper surface point.

The augmenting can include calculating an augmented estimate of a location of each selected estimated upper surface point. This calculation can include applying a linear or non-linear function on the difference between the location of the estimated upper surface point and the location of that point as reflected by the new suggested estimate of the upper surface.

If, for example, a selected estimated upper surface point has coordinates (x1, y1, z1) and the height of a corresponding point (having the same x-axis and y-axis coordinates) of the new suggested estimate of the upper surface has a different height z2 then an augmented estimated upper surface point should have a height z3 that is responsive to the relationship between z1 and z2 and may also be responsive to the confidence level CL1 of the estimated upper surface point. For example z3 may be calculated by applying a linear function such as $z3=z1+CL1*(z2-z1)$.

Figure 6C:
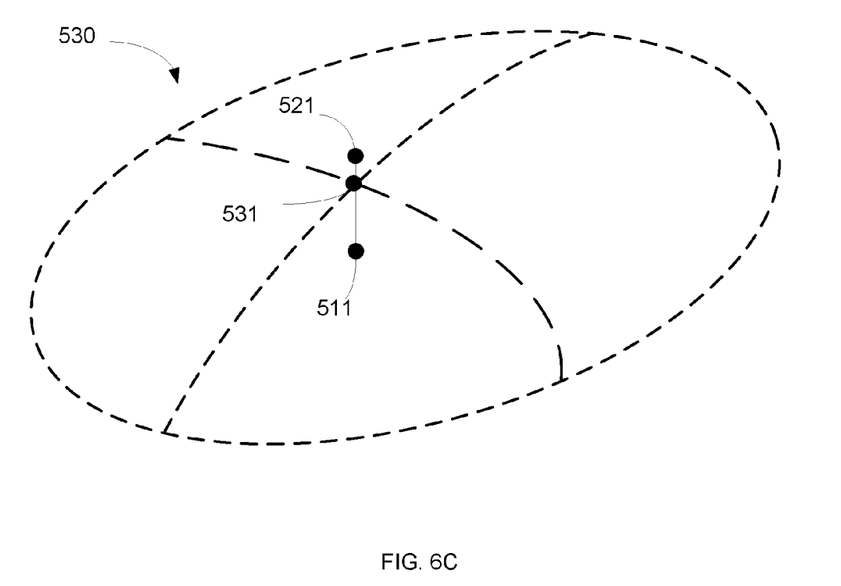
Figure 6D:
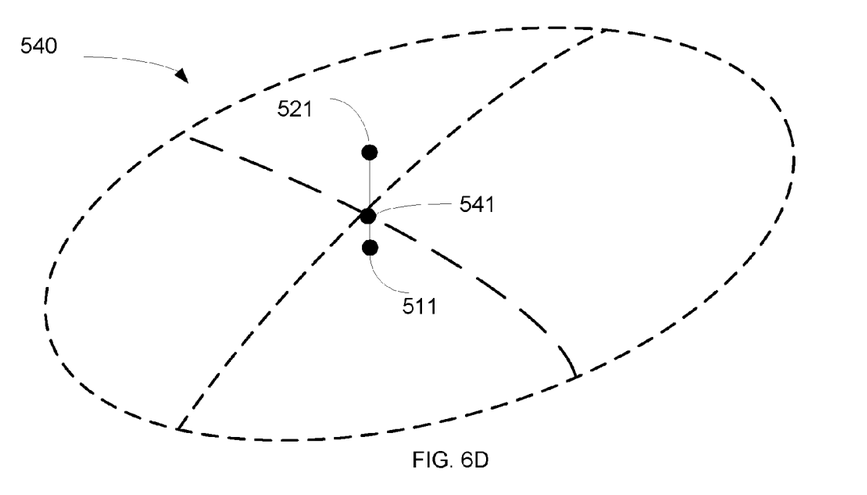

FIGS. 6C and 6D illustrate two different new augmented estimates of the upper surface 530 and 540.

New augmented estimate of the upper surface 530 is closer to new suggested estimate 520 than new augmented estimate of the upper surface 540. The difference stems from different assumptions made about the confidence level of estimated upper surface point 521. FIG. 6C represents a higher confidence level than those of FIG. 6D.

This difference is also represented by differences in the spatial relationship between points 511, 521 and 531 and the spatial relationships between points 511, 521 and 541.

Stage 156 may be followed by stage 157 of determining whether to jump to stage 154 or to end the iterations. If, for example, enough (at least a predetermined number) of estimated upper surface points were selected (for example— all estimated upper surface points were selected) then the process may end—else it may be determined to jump to stage 154 and select new estimated upper surface points.

Stage 150 may be followed by stage 160 of calculating a volume of the content based upon the estimate of the upper surface of the content and the size and shape of the bin.

FIG. 5 illustrates method 200 according to an embodiment of the invention.

Method 200 differs from method 100 by calculating or receiving reference points and by using these reference points during the interpolations.

Method 200 may start by stage 110. Stage 110 may be followed by stage 120. Stage 120 may be followed by stage 130. Stage 130 may be followed by stage 140.

Stage 140 may be followed by stage 250 of calculating or receiving reference points. The reference points may be located outside the bin but relatively proximate to the bin in order to affect the suggested estimates of the upper surface.

Stage 250 may include calculating the reference points in response to the estimated upper surface points and to a non-binary confidence level associated with each estimated upper surface point.

The calculating of the reference points comprises calculating a sum of products, each product equals a height of each estimated upper surface point multiplied by a non-binary confidence level associated with the estimated upper surface point; and setting a height of the reference points in response to the sum of products.

Stage 250 may include setting the reference points at a distance from the bin that is responsive to a dimension of the bin. The distance from the bin can be a fraction of a width of the bin. If the bin has a circular cross section the distance can be a fraction of the diameter of the circular cross section.

Stage 250 may be followed by stage 150'.

Stage 150' includes calculating, by an estimator, the estimate of the upper surface based upon the reference points, the estimated upper surface points and the non-binary confidence level associated with each estimated upper surface point.

Stage 15' may be followed by stage 160.

In the previous method 100 and 200 include stages 110 and 120 that these stages can be excluded from method 100 and 200 and be executed by a computerized system that can a located in proximity to or distant from the receiver 50 and transmitter 40.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for estimating an upper surface of a content of a bin, comprising:
    a receiver that is configured to generate detection signals in response to echoes, received by the receiver, of pulses of acoustic energy that are transmitted by a transmitter towards at least a part of the upper surface of the content of the bin;
    a confidence level module arranged to calculate, in response to the detection signals, estimated upper surface points and to associate a non-binary confidence level with each estimated upper surface point; and
    an estimator that is arranged to calculate an estimate of the upper surface based upon the estimated upper surface points and the non-binary confidence level associated with each estimated upper surface point;
    wherein the system is configured to estimate a volume of the bin in response to the estimate of the upper surface.

2. The system according to claim 1, comprising one or more groups of collinear acoustic transceivers; and wherein the confidence level module is configured to receive detection signals from the one or more groups of collinear acoustic transceivers and to calculate, in response to the detection signals receive detection signals from the one or more groups of collinear acoustic transceivers, the estimated upper surface points and to associate the non-binary confidence level with each estimated upper surface point.

3. The system according to claim 1, comprising an acoustic transceiver that comprises the receiver and a transmitter, wherein the transmitter is configured to transmit, towards the at least part of the upper portion of the content, the pulses of acoustic energy.

4. The system according to claim 3, wherein the acoustic transceiver comprises a pulse shaper, a modulator, a transducer, a demodulator, a pulse compressor and a post processor.

5. The system according to claim 1, wherein the confidence level module comprises a fuzzy logic engine.

6. The system according to claim 5, wherein the interpolation module and the augmentation modules are arranged to operate in an iterative manner to gradually increase a number of estimated upper surface points to be taken into account when calculating the suggested estimates and the augmented suggested estimates of the upper surface.

7. The system according to claim 1, wherein the estimator comprises:
    an interpolation module that is arranged to calculate suggested estimates of the upper surface; and
    an augmentation module that is arranged to augment the suggested estimates of the upper surface to provide augmented estimates in response to non-binary confidence levels of the estimated upper surface points.

8. The system according to claim 7, wherein the interpolation module and the augmentation modules are arranged to operate in an iterative manner to gradually increase a number of estimated upper surface points by a single estimated upper surface point between one iteration to another.

9. The system according to claim 7, wherein the interpolation module and the augmentation modules select the estimated upper surface points in a descending order of confidence levels.

10. The system according to claim 7, wherein the interpolation module applies a natural neighbor interpolation.

11. The system according to claim 1, comprising a reference point module that is arranged to calculate reference points outside the bin; wherein the estimator is arranged to calculate the estimate of the upper surface in response to the estimated upper surface points, the non-binary confidence level associated with each estimated upper surface point and the reference points.

12. The system according to claim 11, wherein the reference point module is arranged to calculate reference points in response to the estimated upper surface points and to the non-binary confidence level associated with each estimated upper surface point.

13. The system according to claim 11, wherein the reference point module is arranged to calculate a sum of products, each product equals a height of each estimated upper surface point multiplied by a non-binary confidence level associated with the estimated upper surface point; and to set a height of the reference points in response to the sum of products.

14. The system according to claim 11, wherein the reference point module is arranged to set the reference points at a distance from the bin that is responsive to a dimension of the bin.

15. The system according to claim 14, wherein the distance from the bin is a fraction of a width of the bin.

16. The system according to claim 1, wherein each non-binary confidence level is selected out of at a continuous range of confidence levels.

17. A computerized method for estimating an upper surface of a content of a bin, comprising:
   generating, by a receiver, detection signals in response to a reception, by the receiver, echoes of pulses of acoustic energy that are transmitted by a transmitter towards at least a part of the upper surface of the content of the bin;
   calculating, in response to detection signals, estimated upper surface points;
   associating, by a confidence level module, a non-binary confidence level with each estimated upper surface point;
   calculating, by an estimator, an estimate of the upper surface based upon the estimated upper surface points and the non-binary confidence level associated with each estimated upper surface point; and
   estimating a volume of the bin in response to the estimate of the upper surface;
   wherein the detection signals are generated by a receiver in response to an irradiation of at least a portion of the upper surface of the content with radiation pulses transmitted by a transmitter.

18. The method according to claim 17, comprising transmitting, by the transmitter, the pulses of acoustic energy towards the at least part of the upper surface of the content of the bin.

19. The method according to claim 17, comprising receiving, by the receiver, echoes of pulses of acoustic energy resulting from a transmission of pulses of acoustic energy, by one or more groups of collinear acoustic transceivers, towards the at least part of the upper surface of the content of the bin; and generating the detection signals in response to the echoes of pulses of acoustic energy by the one or more groups of collinear acoustic transceivers.

20. The method according to claim 17, comprising transmitting, by the transmitter, pulses of acoustic energy towards the upper surface of the content.

21. The method according to claim 17, comprising associating the non-binary confidence level with each estimated upper surface point by applying a fuzzy logic algorithm.

22. The method according to claim 17, comprising:
   calculating, by an interpolation module, suggested estimates of the upper surface; and
   augmenting, by an augmentation module, the suggested estimates of the upper surface to provide augmented estimates in response to non-binary confidence levels of the estimated upper surface points.

23. The method according to claim 22, comprising repeating the stages of:
   selecting at least one new estimated upper surface point;
   calculating, by the interpolation module, a new suggested estimate of the upper surface while taking into account the at least one new estimated upper surface point and previously selected estimated upper surface points;
   augmenting, by the augmentation module, the new suggested estimate of the upper surface to provide a new augmented estimate, wherein the augmenting is responsive to each non-binary confidence level of the at least one new estimated upper surface point.

24. The method according to claim 23, comprising selecting the at least one new estimated upper surface point in a descending order of confidence levels.

25. The method according to claim 23, wherein the calculating, by the interpolation module, of the new suggested estimate comprises applying a natural neighbor interpolation.

26. The method according to claim 22, comprising selecting a single new estimated upper surface point at each repetition of the stages.

27. The method according to claim 17, comprising calculating reference points outside the bin; wherein the calculating, by an estimator, of the estimate of the upper surface is further responsive to the reference points.

28. The method according to claim 27, wherein the calculating of the reference points is responsive to the estimated upper surface points and to a non-binary confidence level associated with each estimated upper surface point.

29. The method according to claim 27, wherein the calculating of the reference points comprises calculating a sum of products, each product equals a height of each estimated upper surface point multiplied by a non-binary confidence level associated with the estimated upper surface point; and setting a height of the reference points in response to the sum of products.

30. The method according to claim 17, comprising setting the reference points at a distance from the bin that is responsive to a dimension of the bin.

31. The method according to claim 30, wherein the distance from the bin is a fraction of a width of the bin.

32. The method according to claim 17, wherein each non-binary confidence level is selected out of at a continuous range of confidence levels.

33. A non-transitory computer readable medium that stores instruction that cause a computerized system to:
   generate, by a receiver, detection signals in response to echoes, received by the receiver, of pulses of acoustic energy that are transmitted by a transmitter towards at least a part of the upper surface of the content of the bin;
   calculate, in response to the detection signals, estimated upper surface points;
   associate a non-binary confidence level with each estimated upper surface point; and
   calculate, by an estimator, an estimate of the upper surface based upon the estimated upper surface points and the non-binary confidence level associated with each estimated upper surface point; and
   estimating a volume of the bin in response to the estimate of the upper surface.

34. The non-transitory computer readable medium according to claim 33, wherein the radiation pulses are pulses of acoustic energy and the receiver receives echoes of the pulses of acoustic energy.

* * * * *